(12) United States Patent
Dong et al.

(10) Patent No.: US 9,054,837 B2
(45) Date of Patent: Jun. 9, 2015

(54) DEMODULATION METHOD AND APPARATUS, DECODING METHOD AND APPARATUS AND BASEBAND CHIP IN COMMUNICATION SYSTEM

(71) Applicant: Spreadtrum Communications (Shanghai) Co., Ltd., Shanghai (CN)

(72) Inventors: Yu Dong, Shanghai (CN); Jingxin Liang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 138 days.

(21) Appl. No.: 13/731,405

(22) Filed: Dec. 31, 2012

(65) Prior Publication Data

US 2014/0185712 A1 Jul. 3, 2014

(51) Int. Cl.
*H04L 1/00* (2006.01)
*H04L 27/26* (2006.01)

(52) U.S. Cl.
CPC .......... *H04L 1/0036* (2013.01); *H04L 27/2649* (2013.01); *H04L 1/0045* (2013.01)

(58) Field of Classification Search
CPC .. H04L 1/0036; H04L 27/2649; H04L 1/0045
USPC .................. 375/260, 262, 316, 340, 341, 342
See application file for complete search history.

(56) References Cited

U.S. PATENT DOCUMENTS

| 2007/0147227 A1 | 6/2007 | Jaenecke |
| 2009/0245431 A1 | 10/2009 | Challa et al. |
| 2010/0284347 A1 | 11/2010 | Ahn et al. |
| 2011/0085458 A1 | 4/2011 | Montojo et al. |
| 2013/0294547 A1* | 11/2013 | Lane et al. ..................... 375/340 |
| 2014/0105087 A1 | 4/2014 | Gupta et al. |

FOREIGN PATENT DOCUMENTS

| CN | 101201800 A | 6/2008 |
| CN | 101287122 A | 10/2008 |
| CN | 101374340 A | 2/2009 |

(Continued)

OTHER PUBLICATIONS

Office Action dated Nov. 28, 2013 in Chinese Patent Application No. 201110431051.6, with English Notification sheet, 12 pages.

(Continued)

*Primary Examiner* — Leon Flores
(74) *Attorney, Agent, or Firm* — Vierra Magen Marcus LLP

(57) ABSTRACT

The present disclosure provides a demodulation method and apparatus, a decoding method and apparatus and a baseband chip in a communication system. The decoding method includes: when demodulated data in a buffer space is enough to form a second predetermined number of CB data, reading the demodulated data to form the second predetermined number of CB data from the buffer space; decoding the second predetermined number of CB data. The buffer space includes a plurality of buffer regions corresponding to different CWs. Each of buffer regions store the demodulated data belonging to the CW, reading the demodulated data to form the second predetermined number of CB data in the buffer space includes reading the demodulated data belonging to the CW in the buffer region corresponding to the CW. The present disclosure saves memory space of the baseband chip.

28 Claims, 6 Drawing Sheets

(56) References Cited

FOREIGN PATENT DOCUMENTS

| CN | 102158446 | A | 8/2011 |
|---|---|---|---|
| CN | 102255840 | A | 11/2011 |
| CN | 102271402 | A | 12/2011 |
| WO | 2011081735 | A1 | 7/2011 |

OTHER PUBLICATIONS

English Abstract of CN102255840A dated Nov. 23, 2011, 2 pages.
U.S. Appl. No. 13/731,391, filed Dec. 31, 2012.
Office Action dated Apr. 15, 2014 in Chinese Patent Application No. 201110431033.8, with English notification sheet, 9 pages.
English Abstract of CN101201800 dated Jun. 18, 2008, 1 page.
English Abstract of CN102158446 dated Aug. 17, 2011, 1 page.
Office Action dated May 23, 2014 in U.S. Appl. No. 13/731,391, 26 pages.
Office Action dated Nov. 29, 2013 in Chinese Patent Application No. 201110431033.8, with English notification sheet, 12 pages.
English Abstract of CN101287122A dated Oct. 15, 2008, 2 pages.
English Abstract of CN101374340A dated Feb. 25, 2009, 2 pages.
English Abstract of CN102271402A dated Dec. 7, 2011, 2 pages.
Response to Office Action filed Aug. 25, 2014 in U.S. Appl. No. 13/731,391, 10 pages.
Final Office Action dated Dec. 15, 2014 in U.S. Appl. No. 13/731,391, 28 pages.
Response to Final Office Action filed Feb. 18, 2015 in U.S. Appl. No. 13/731,391, 10 pages.

\* cited by examiner

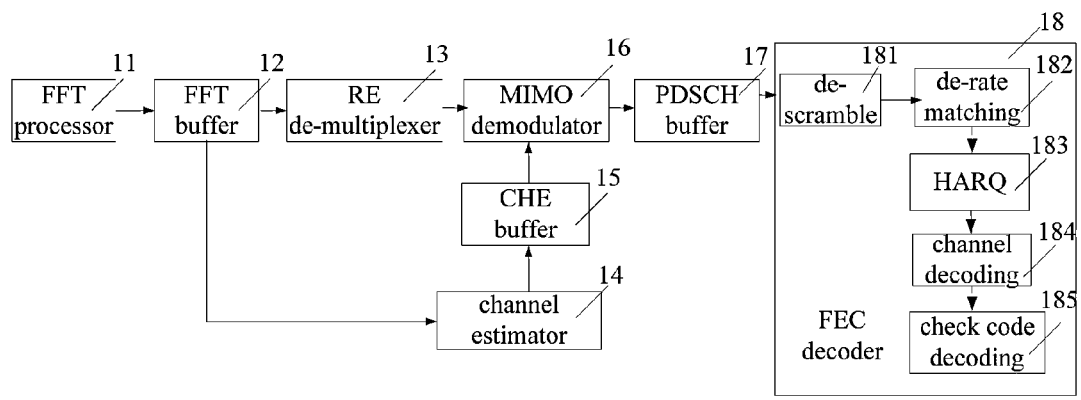

Figure 1 (prior art)

| demodulating RE belonging to the downlink channel in OFDM symbols one by one to obtain demodulated data; storing the demodulated data in a buffer space; suspending demodulating RE data when the buffer space does not have enough space to store a first predetermined number of demodulated data | S11 |

| continuing demodulating RE when the buffer space has enough space to store the first predetermined number of demodulated data and storing the demodulated RE data in the buffer space | S12 |

Figure 2

DEMODULATION METHOD AND APPARATUS, DECODING METHOD AND APPARATUS AND BASEBAND CHIP IN COMMUNICATION SYSTEM

FIELD OF THE DISCLOSURE

The present disclosure generally relates to mobile communication technology, and more particularly, to a demodulation method and apparatus, a decoding method and apparatus and a baseband chip in a communication system.

BACKGROUND

Long Term Evolution (LTE) is an evolution of the Third Generation Mobile Communication (3G). It improves and enhances the radio interface technologies of 3G, and uses Orthogonal Frequency Division Multiplexing (OFDM) and Multiple-Input Multiple-Output (MEMO) as sole standards of the wireless network evolution. LTE can provide 150 Mbit/s peak rate of uplink and 300 Mbit/s peak rate of downlink in 20 MHZ spectral bandwidth. Meanwhile, LTE improves the performance to cell-edge users, increases cell capacity and decreases system delay. Compared with 3G, LTE has advantages of high communication rate and spectrum efficiency, low wireless network delay, continuous area coverage and downward compatibility. However, the implementation of LTE requires a high-level design for User Equipment (UE) terminal, such as high baseband chip's ability to demodulate service data carried in a downlink channel and decode the demodulated data at a terminal, and taking as little as possible memory space of the baseband chip.

FIG. 1 illustrates a conventional method for processing a Physical Downlink Control Channel (PDSCH) in a TD-LIE system. Referring to FIG. 1, after a UE receives OFDM symbols sent from a base station, a Fast Fourier Transformation (FFT) processor 11 processes the received OFDM symbols to form FFT data. The FFT data is stored in a FFT buffer 12 and de-multiplexed by a Resource Element (RE) de-multiplexer 13, namely, extracting RE data in the PDSCH of the UE among the FFT data. Meanwhile, channel parameters are extracted from the FFT data through a Channel Estimation (CHE) unit 14, therefore a CUE result (i.e. channel parameters) which matches with an OFDM symbol is output into a CHE buffer 15. Then, after a MIMO demodulator 16 demodulates the RE data from the RE de-multiplexer 13 by employing the CHE results in the CHE buffer 15, the demodulated data (generally being soft-bit data) is stored in a buffer space 17 in the PDSCH. When the demodulated data in the buffer space 17 in the PDSCH accumulates to a subframe, a Forward Error Correction (FEC) decoder 18 starts to decode the subframe. And the FEC decoder 18 includes a de-scramble unit 181, a de-rate matching unit 182, a Hybrid Automatic Repeat Request (HARQ) unit 183, a channel decoding unit 184 and a check code decoding unit 185, etc.

Therefore, FEC decoding of the PDSCH is performed in subframe. In practice, a pipeline in subframe is formed between the MIMO demodulator 16 and the FEC decoder 18, namely, MIMO demodulation of a current subframe and FEC decoding of a previous subframe are performed in parallel. Therefore, soft-bit data of two subframes need to be cached in the buffer space 17 of the PDSCH, which occupies a lot of memory space of a baseband chip.

More information relative to a method for demodulating and decoding of a PDSCH may refer to US patent publication No. US2011085458A1 entitled "DOWNLINK CONTROL INFORMATION FOR EFFICIENT DECODING", however, which still leaves aforementioned problems unsolved.

SUMMARY

The present disclosure provides a method and apparatus to save memory space of a baseband chip in a UE.

Embodiments of the present disclosure provide a demodulation method in a communication system, in order to demodulate service data in a downlink channel, including: demodulating RE data belonging to the downlink channel in OFDM symbols one by one to obtain demodulated data and storing the demodulated data in a buffer space; suspending demodulating RE data when the buffer space does not have enough space to store a first predetermined number of demodulated data; continuing demodulating RE data when the buffer space has enough space to store the first predetermined number of demodulated data and storing the demodulated RE data in the buffer space; where RE data includes information modulated in a plurality of CWs (Code Word), the buffer space includes a plurality of buffer regions corresponding to different CWs, the demodulated data includes a plurality of demodulated data belonging to different CWs and storing the demodulated data in the buffer space includes storing the demodulated data belonging to different CWs in corresponding buffer regions corresponding to CWs respectively.

Optionally, suspending demodulating RE data when the buffer space does not have enough space to store the first predetermined number of demodulated data includes: suspending demodulating RE data as long as there is one buffer region corresponding to a CW in the buffer space not having enough space to store the first predetermined number of demodulated data belonging to the CW.

Optionally, continuing demodulating RE data when the buffer space has enough space to store the first predetermined number of demodulated data includes: continuing demodulating RE data when each of the plurality of buffer regions corresponding to CWs in the buffer space has enough space to store the first predetermined number of demodulated data belonging to the CW.

Optionally, the buffer regions may be First Input First Output (FIFO) buffers.

Optionally, the amount of the buffer regions may be 2 or 4.

Optionally, the first predetermined number may be equal to or greater than 1.

Optionally, the demodulated data may be soft-bit data.

Optionally, before demodulating RE data in OFDM symbols one by one, the method further includes: obtaining RE data corresponding to the downlink channel in the OFDM symbols and CHE data corresponding to the OFDM symbols.

Optionally, the communication system may be a TD-LTE system and the downlink channel may be a PDSCH.

Embodiments of the present disclosure further provide a demodulation apparatus in a communication system to demodulate downlink service data according to the demodulation method. The demodulation apparatus includes: a demodulation unit configured to demodulate RE data belonging to the downlink channel in OFDM symbols one by one to obtain demodulated data; a storing unit configured to store the demodulated data from the demodulation unit in a buffer space; and a control unit configured to control the demodulation unit to suspend demodulating RE data when the buffer space does not have enough space to store the first predetermined number of demodulated data, and control the demodulation unit to continue demodulating the RE data when the buffer space has enough space to store the first predetermined number of demodulated RE data, and control the storing unit to store the demodulated RE data in the buffer space; where the RE data includes information modulated in a plurality of CWs, the buffer space includes a plurality of buffer regions corresponding to CWs respectively, the demodulated RE data includes a plurality of demodulated RE data belonging to different CWs and the storing unit is configured to store the demodulated data belonging to different CWs into corresponding buffer regions corresponding to CWs respectively.

Embodiments of the present disclosure further provide a decoding method in a communication system. The decoding method is configured to decode demodulated data in a downlink channel, including: when the demodulated data in a buffer space is enough to form a second predetermined number of Code Block (CB) data, reading all the demodulated data which forms the second predetermined number of CB data in the buffer space respectively; and decoding the second predetermined number of CB data respectively; where the buffer space includes a plurality of buffer regions, each of the plurality of buffer regions stores the demodulated data belonging to the CW, reading all the demodulated data which forms the second predetermined number of CB data in the buffer space respectively includes: reading the demodulated data belonging to the CWs and enough to form the second predetermined number of CB data from buffer regions corresponding to CWs respectively.

Optionally, the buffer regions may be FIFO buffers.

Optionally, the amount of the buffer regions may be 2 or 4.

Optionally, the second predetermined number may be 1 to 3.

Optionally, the demodulated data may be soft-bit data.

Embodiments of the present disclosure further provide a decoding apparatus in a communication system to decode downlink channel demodulated data according to the decoding method. The decoding apparatus includes: a reading unit configured to read all the demodulated data which forms a second predetermined number of CB data respectively in a buffer space, when the demodulated data in the buffer space is enough to form the second predetermined number of CB data; and a decoding unit configured to decode the second predetermined number of CB data read by the reading unit; where the buffer space includes a plurality of buffer regions corresponding to CWs respectively, each of the buffer regions corresponding to a CW stores demodulated data belonging to the CW, and the reading unit is configured to read demodulated data belonging to CWs and enough to form the second predetermined number of CB data from the buffer regions corresponding to CWs respectively.

Embodiments of the present disclosure further provide a baseband chip including above-mentioned demodulation apparatus and the decoding apparatus in a communication system.

Compared with the prior art, the present disclosure has the following advantages.

A demodulation method in a communication system is provided. In the demodulation method, RE data belonging to the downlink channel in OFDM symbols is demodulated one by one to obtain demodulated data and the demodulated data is stored in a buffer space; demodulating the RE data is suspended when the buffer space does not have enough space to store a first predetermined number of demodulated data; and demodulating RE data is continued when the buffer space has enough space to store the first predetermined number of demodulated data and the demodulated data of RE data is stored in the buffer space. Since the RE data includes information modulated in a plurality of CWs, the buffer space includes a plurality of buffer regions corresponding to CWs. The demodulated data is stored in corresponding buffer regions according to the CWs the demodulated data belongs to, respectively.

In the present disclosure, a decoding method in a communication system is provided based on the demodulation method. The decoding method is configured to: when the demodulated data stored in a buffer space is enough to form a second predetermined number of CB data, all the demodulated data to form the second predetermined number of CB data is read from the buffer space; and the second predetermined number of CB data is decoded respectively. Since the buffer space includes a plurality of buffer regions corresponding to CWs, and each of the buffer regions stores the demodulated data belonging to the CW, correspondingly, the demodulated data belonging to CWs and enough to form second predetermined number of CB data is read from the plurality of buffer regions respectively. In some embodiments, the buffer regions may be FIFO buffers. When the demodulated data in a buffer space is enough to form a second predetermined number of CB data, all the decoded RE data in the CB data is read one by one in the order of FIFO and the CB data is then decoded.

The present disclosure can realize in a baseband chip in a UE that the demodulation process stores the demodulated RE data in a buffer space constantly and the decoding process starts to decode when at least one CB data is cached in the buffer space, the demodulation process suspends and waits the decoding process to read the demodulated data when the buffer space is full of the demodulated data, and the decoding process suspends decoding and waits the demodulation process to store the demodulated data in the buffer space when there is less than one CB data in the buffer space.

Thus, it's not necessary to start decoding only when there is a subframe demodulated data in the buffer space. The decoding process can start as long as there is one CB data cached in the buffer space. As a result, demodulation and decoding of one subframe can be performed in parallel, thereby saving the memory space in the baseband chip. Furthermore, since decoding process starts decoding when one CB data is cached in the buffer space, decoding delay is decreased and the real-time performance of a communication system is improved.

BRIEF DESCRIPTION OF THE DRAWINGS

FIG. 1 illustrates a schematic diagram of a conventional method for processing a PDSCH in a TD-LTE system;

FIG. 2 illustrates a schematic flow chart of a demodulation method in a communication system according to one embodiment of the present disclosure;

DETAILED DESCRIPTION OF THE DISCLOSURE

The present disclosure provides a demodulation method and apparatus, a decoding method and apparatus, and a baseband chip in a communication system. In the baseband chip, the demodulation process stores the demodulated RE data in a buffer space constantly while the decoding process starts decoding when at least one CB data is cached in the buffer space; the demodulation process suspends and waits the decoding process to read demodulated data when the buffer space is full of demodulated data, the decoding process suspends and waits the demodulation process stores demodulated data in the buffer space when there is less than one CB data in the buffer space. It's not necessary to start decoding when there is demodulated data of a subframe in the buffer space. The decoding process starts when one CB data is cached in the buffer space. As a result, demodulation and decoding of one subframe may be performed in parallel, thereby saving the memory space in the baseband chip. Furthermore, since decoding process starts decoding when at least one CB data is cached in the buffer space, decoding delay may decrease and the real-time performance of a communication system may be improved.

In order to clarify the objects, characteristics and advantages of the disclosure, embodiments of present disclosure will be described in detail in conjunction with accompanying drawings.

However, the present disclosure is not limited to the embodiments described below.

FIG. 2 illustrates a schematic flow chart of a demodulation method in a communication system in the present disclosure. Referring to FIG. 2, the demodulation method includes the following steps of Step S11 and Step S12.

In Step S11, RE data belonging to a downlink channel in OFDM symbols is demodulated one by one to obtain demodulated data; the demodulated data is stored in a buffer space; and demodulating the RE data is suspended when the buffer space does not have enough space to store a first predetermined number of demodulated data.

In Step S12, demodulating RE data is continued when the buffer space has enough space to store the first predetermined number of demodulated data and the first predetermined number of demodulated data of RE data is stored in the buffer space.

In some embodiments, the communication system is a TD-LTE system and the downlink channel is a PDSCH. In the following embodiments, the demodulation method of a PDSCH in a TD-LTE system is taken for example, which does not tend to limit the scope of the invention.

Figure 3A:
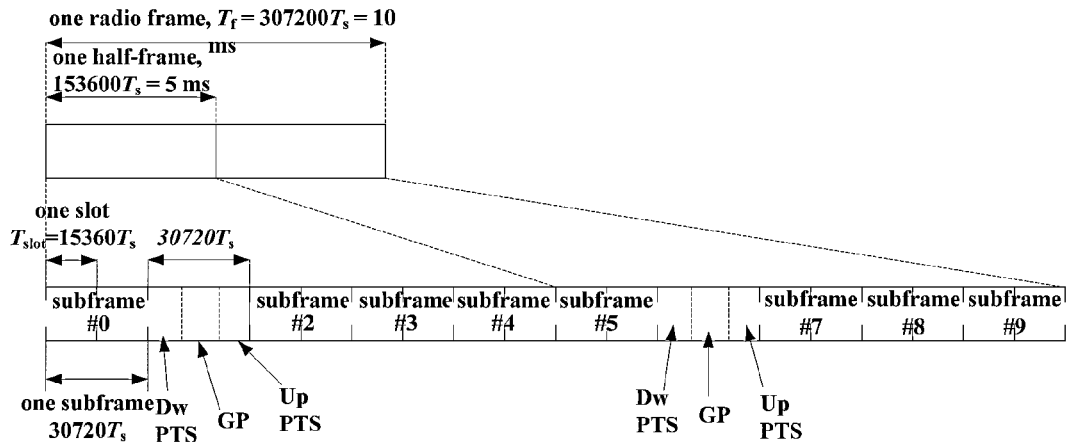
FIG. 3a illustrates a schematic diagram of a TD-LTE frame structure.
Figure 3B:
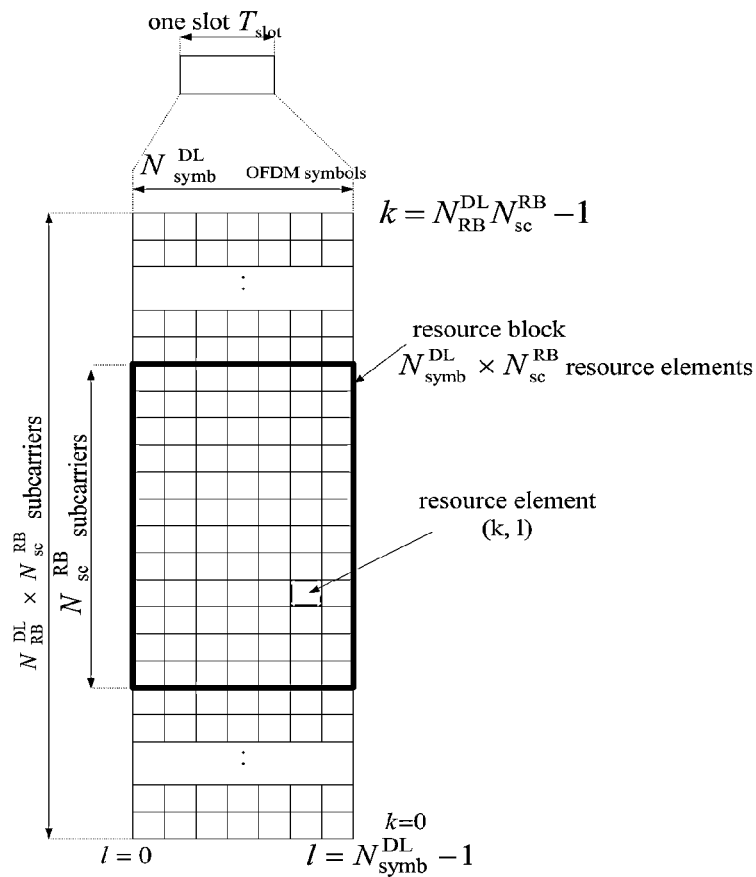
FIG. 3b illustrates a schematic diagram of radio resource structure of a slot in a downlink channel in the TD-LTE frame.

To describe embodiments of present disclosure conveniently, structure of a TD-LTE frame is described. FIG. 3a illustrates a schematic diagram of a TD-LTE frame structure and FIG. 3b illustrates a schematic diagram of a radio resource structure of a slot in a downlink channel.

Specifically, referring to FIG. 3a, $T_f$ is a length of a radio frame, $T_f=307200T_s=10$ ms. Each radio frame may include ten subframes, where the length of each subframe is $30720T_s$ and each subframe may include two slots of length $T_{slot}=15360T_s$. Referring to FIG. 3b, a slot includes $N_{symb}^{DL}$ OFDM symbols. Each OFDM symbol has $N_{RB}^{DL} \times N_{sc}^{RB}$ subcarriers in frequency. One of the $N_{RB}^{DL} \times N_{sc}^{RB}$ subcarriers is the smallest radio resource unit, which is referred to as RE. The numbers of $N_{symb}^{DL}$ and $N_{RB}^{DL} \times N_{sc}^{RB}$ may be set according to relative communication protocols.

Figure 4:
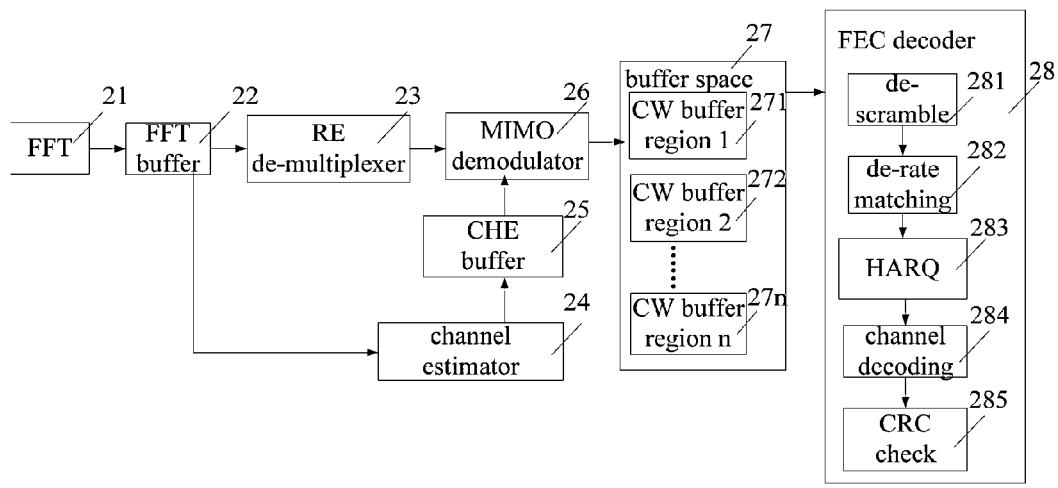
FIG. 4 illustrates a schematic flow chart of processing a PDSCH in a communication system in the present disclosure.

Hereunder, the demodulation method shown in FIG. 2 is described in detail in conjunction with the schematic flow chart of processing a PDSCH in a communication system in the present disclosure shown in FIG. 4.

In a TD-LTE system, data sent from a base station to a UE is mainly carried in the PDSCH. PDSCH demodulation of a subframe is controlled by information carried in the PDCCH of the subframe. First, the PDCCH of the current subframe is demodulated and decoded to obtain PDSCH information. And the PDSCH is demodulated according to the PDSCH information. The demodulation and decoding of the PDCCH is known to those skilled in the art and is not described in detail.

TB (Transport block) data is invoked in subframe in the PDSCH in the TD-LTE system. Each TB is segmented into several Code Blocks (CB) according to communication protocol 3GPP TS 36.211 V8.7.0. The base station invokes the size of the TB data and schemes for encoding and modulating a channel according to MIMO channel information which is transmitted in the TB data. The MIMO channel information includes the numbers of transmitting and receiving antennae in the TD-LTE system. For example, 2*2MIMO represents the base station (namely, sending terminal) has 2 antennae configured to transmit and receive data, and the UE (receiving terminal) has 2 antennae configured to transmit and receive data. In an air interface, the greatest number of the CW is determined according to the minimum number of antennae between the sending terminal and the receiving terminal. For example, for 2*2MIMO, the number of CWs is 2. Each CW carries one TB data.

Each TB data transmitted from the base station to the UE is carried in the PDSCH and data carried in the PDSCH is distributed in a plurality of OFDM symbols. Namely, the TB data is distributed in a plurality of RE in the plurality of OFDM symbols for transmission, thereby forming RE data. A method for demodulating the RE data sent from the PDSCH according to one embodiment of the disclosure may include following process.

First, as described in Step S11, RE data belonging to the downlink channel in OFDM symbols is demodulated one by one to obtain demodulated data; the demodulated data is stored in a buffer space; demodulating the RE data is suspended when the buffer space does not have enough space to store a first predetermined number of demodulated data.

In practice, before Step S11, the demodulation method may further include: obtaining RE data corresponding to the downlink channel in the OFDM symbols and CHE data corresponding to the OFDM symbols. In some embodiments, the downlink channel may be a PDSCH. Referring to FIG. 4, the process of a MEMO demodulator 26 obtaining the RE data and the CHE data may refer to the description in background, and is not described in detail herein.

The MIMO demodulator 26 demodulates the RE data in the OFDM symbols one by one to obtain demodulated data. The demodulated data is soft-bit data. It should be noted, all the OFDM symbols demodulated one by one here are OFDM symbols which include data carried in the PDSCH. Which OFDM symbols include data carried in the PDSCH may be determined by relative communication protocols.

The demodulated data may be stored in a buffer space 27. Different from the existing technology, the buffer space 27 is segmented into a plurality of buffer regions, such as CW buffer region 1, CW buffer region 2, . . . , and CW buffer region n shown in FIG. 4. Each of the plurality of buffer regions corresponds to one CW. As described above, since each RE data belongs to a plurality of CWs, the demodulated RE data belongs to a plurality of CWs as well.

Therefore, the demodulated data output by the MIMO demodulator 26 is stored in corresponding buffer regions respectively. Specifically, the RE data belonging to CW-1 is stored in the CW buffer region 1 after being demodulated, the RE data belonging to CW-2 is stored in the CW buffer region 2 after being demodulated, and so on, the RE data belonging to CW-n is stored in the CW buffer region n after being demodulated.

In some embodiments, the plurality of buffer regions may be FIFO buffers. According to the MIMO channel information, the amount of the buffer regions may be 2 or 4. Namely, for 2*2MIMO, the sending terminal (base station) has 2 antennae and the receiving terminal (UE) has 2 antenna as well. The number of the greatest CWs is 2 and the number of the buffer regions corresponding to the CW in the buffer space is 2. For 4*4MIMO, the sending terminal (base station) has 4 antennae and the receiving terminal (UE) has 4 antennae as well. The number of the greatest CW is 4 and the number of the buffer regions corresponding to the CW in the buffer space is 4.

Then demodulating the RE data is suspended when the buffer space does not have enough space to store a first predetermined number of demodulated data. In some embodiments, suspending demodulating RE data when the buffer space does not have enough space to store the first predetermined number of demodulated data means suspending demodulating RE data as long as there is one buffer region corresponding to a CW in the buffer space not having enough space to store the first predetermined number of demodulated data which belongs to the CW. This is because the RE data belonging to different CWs is demodulated in parallel in the UE and the demodulated data is stored in corresponding buffer regions corresponding to the CWs. Therefore, it is necessary to suspend demodulating RE data as long as there is one buffer region corresponding to a CW in the buffer space not having enough space to store the first predetermined number of demodulated data. In some embodiments, the first predetermined number may be equal to or greater than 1. In practice, the first predetermined number may be a greater value to reduce a coupling degree between the MIMO demodulator 26 and a FEC decoder 28. In other words, the greater the first predetermined number is, the less times the MIMO demodulator 26 suspends demodulating, which thereby improves consistency between the demodulation and the decoding.

Thereafter, as described in Step S12, demodulating RE data is continued when the buffer space has enough space to store the first predetermined number of demodulated data and the demodulated data of RE data is stored in the buffer space.

Specifically, according to Step S11, when the buffer space does not have enough space to store the first predetermined number of demodulated data, the MIMO demodulator 26 suspends demodulating RE data and waits for the FEC decoder 28 to read the demodulated data from the buffer space till the buffer space has enough space to store the first predetermined number of demodulated data, at this time, demodulating RE data processes are restored and demodulated RE data is stored in the buffer space.

In some embodiments, the buffer space having enough space to store the first predetermined number of demodulated data means each buffer region corresponding to a CW in the buffer space has enough space to store the first predetermined number of demodulated data which belongs to the CW. This is also because the RE data belonging to different CWs are demodulated in parallel and the demodulated RE data is stored in different CW buffer regions respectively. So, it is necessary for each buffer region having enough space to store the first predetermined number of demodulated data. Furthermore, processes of the MIMO demodulator 26 continuing demodulating the RE data and storing the demodulated RE data in the buffer space may refer to Step S11, which is not described in detail herein.

Figure 8:
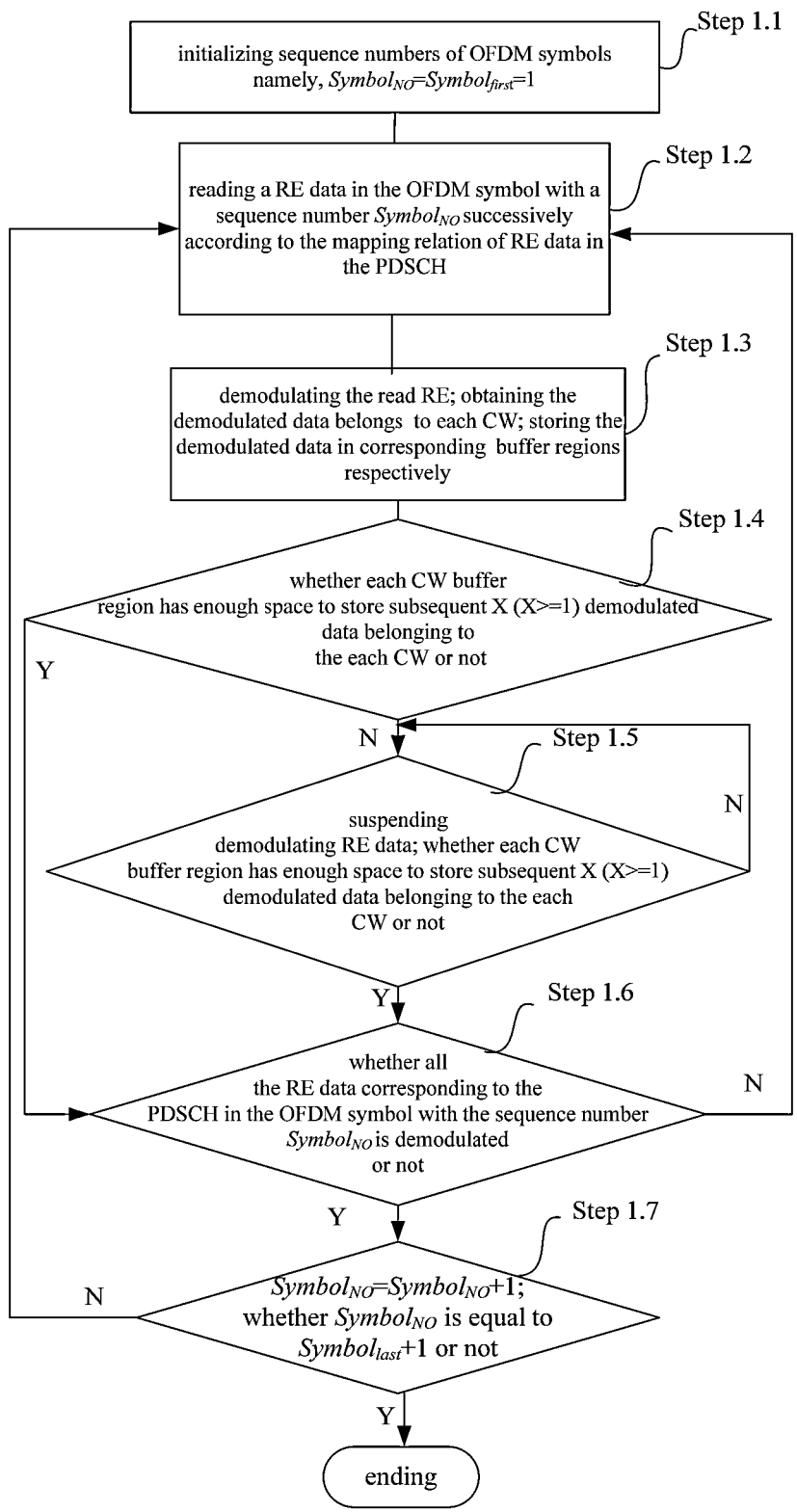
FIG. 8 illustrates a schematic flow chart of a demodulation method of one subframe in a communication system according to one embodiment of the present disclosure.

In the following embodiment, the demodulation method is described in detail. Provided that the number of OFDM symbols which include data carried in the PDSCH is 13, the sequence number of the first OFDM symbol $Symbol_{first}=1$, and the sequence number of the last OFDM symbol $Symbol_{last}=13$, the number of buffer regions corresponding to the CWs in the buffer space is 2, the first predetermined number is X, wherein X>=1. Referring to FIG. 8, FIG. 8 illustrates a schematic flow chart of the demodulation method in the embodiment.

In Step 1.1, initializing sequence numbers of OFDM symbols from a first OFDM symbol which includes data carried in the PDSCH, namely $Symbol_{NO}=Symbol_{first}=1$, wherein $Symbol_{NO}$ denotes a sequence number of an OFDM symbol which includes data carried in the PDSCH.

In Step 1.2, reading a RE data in the OFDM symbol with a sequence number $Symbol_{NO}$ successively according to the mapping relation of RE data in the PDSCH and obtaining CHE data corresponding to the OFDM symbol.

In Step 1.3, demodulating the read RE data, wherein the RE data includes information modulated in 2 CWs. After demodulation, demodulated data (soft-bit data) of the 2 CWs is obtained and stored in corresponding buffer regions respectively according to the CWs the demodulated data belonging to. That is, the demodulated data belonging to a $1^{st}$ CW is stored in a CW buffer region 1 and the demodulated data belonging to a $2^{nd}$ CW is stored in a CW buffer region 2.

In Step 1.4, determining whether each CW buffer region has enough space to store X demodulated data belonging to different CWs or not; if each CW buffer region has enough space to store X (X>=1) demodulated data belonging to the each CW, proceeding to Step 1.6; otherwise, namely, as long as there is one buffer region not having enough space to store X demodulated data belonging to the CW, proceeding to Step 1.5.

In Step 1.5, suspending demodulating RE data; when each buffer region in the buffer space has enough sapce to store X (X>=1) demodulated data which belongs to the each CW, proceeding to Step 1.6; otherwise, executing Step 1.5 repeatedly.

In Step 1.6, determining whether all the RE data corresponding to the PDSCH in the OFDM symbol having a sequence number of $Symbol_{NO}$ are demodulated or not, if so, proceeding to Step 1.7; otherwise, proceeding to Step 1.2.

In Step 1.7, $Symbol_{NO}=Symbol_{NO}+1$, determining whether all the OFDM symbols are demodulated or not, namely, whether the current $Symbol_{NO}$ is equal to $Symbol_{last}+1$ or not, if so, the demodulation of a subframe in the PDSCH is finished; otherwise, proceeding to Step 1.2.

Figure 5:
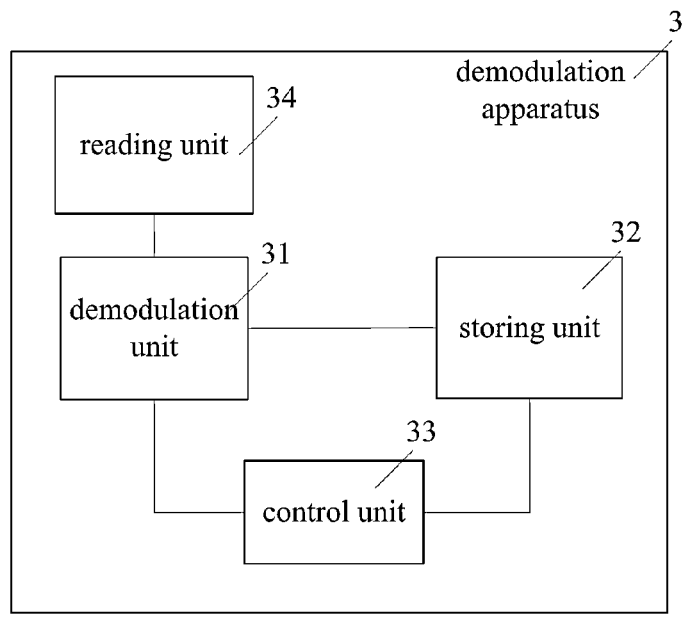
FIG. 5 illustrates a schematic structure diagram of a demodulation apparatus in a communication system according to one embodiment of the present disclosure.

Embodiments of the present disclosure further provide a demodulation apparatus in a communication system according to the demodulation method. FIG. 5 illustrates a schematic structure diagram of the demodulation apparatus in a communication system according to one embodiment of the present disclosure. In some embodiments, the communication system is a TD-LTE system and the downlink channel is a PDSCH. In the following embodiment, a demodulation method of a PDSCH in a TD-LTE system is taken for example, which should not tend to limit the scope of the invention.

Referring to FIG. 5, a demodulation apparatus 3 includes a demodulation unit 31, a storing unit 32 and a control unit 33. The demodulation unit 31 is configured to demodulate RE data belonging to the downlink channel in OFDM symbols one by one to obtain demodulated data; the storing unit 32 is configured to store the demodulated data in a buffer space; the control unit 33 is configured to control the demodulation unit 31 to suspend demodulating the RE data when the buffer space does not have enough space to store the first predetermined number of demodulated data, and control the demodulation unit 31 to continue demodulating RE data when the buffer space has enough space to store the first predetermined number of demodulated data and control the storing unit 32 to store the demodulated RE data in the buffer space.

In some embodiments, since the RE data includes information modulated in a plurality of CWs, the buffer space includes a plurality of buffer regions. The demodulated data includes a plurality of demodulated data belonging to different CWs. The storing unit 32 is configured to store the plurality of demodulated data belonging to different CWs in corresponding buffer regions respectively. The demodulation apparatus further includes a read unit 34 configured to read one RE data in the OFDM symbols and the CHE data corresponding to the downlink channel according to the mapping sequence of RE data in the downlink channel before the demodulation unit 31 demodulates the RE data.

In some embodiments, suspending demodulating RE data when the buffer space does not have enough space to store the first predetermined number of demodulated data means suspending demodulating RE data as long as there is one buffer region corresponding to the CW in the buffer space not having enough space to store the first predetermined number of demodulated data which belongs to the CW. Continuing demodulating RE data when the buffer space has enough space to store the first predetermined number of demodulated data means continuing demodulating RE data when all the plurality of buffer regions in the buffer space have enough space to store the first predetermined number of demodulated data which belong to different CWs. The buffer regions are FIFO buffers, and the amount of the buffer regions may be 2 or 4 according to MIMO channel information, and the demodulated data is soft-bit data.

The detailed process of the demodulation apparatus 3 may refer to the detailed process of the demodulation method in a communication system, which is not described in detail herein.

Figure 6:
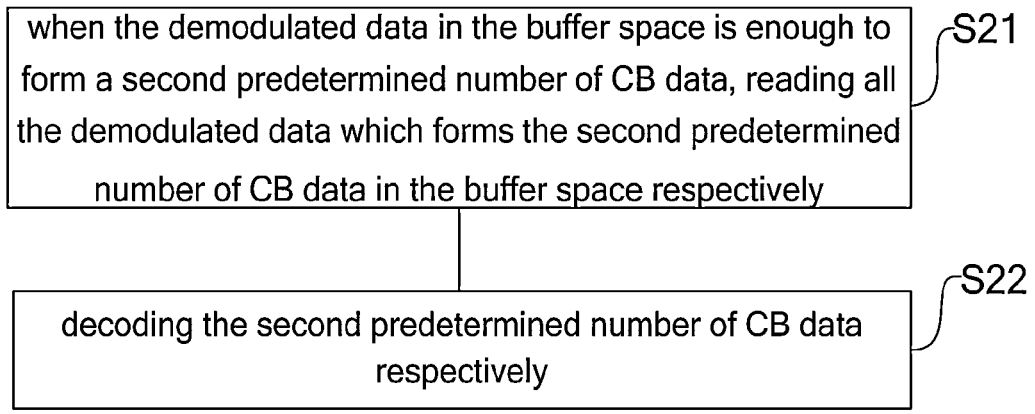
FIG. 6 illustrates a schematic flow chart of a decoding method in a communication system according to one embodiment of the present disclosure.

Embodiments of the present disclosure further provide a decoding method in a communication system, configured to decode the demodulated data in the downlink channel. FIG. 6 illustrates a schematic flow chart of a decoding method in a communication system according to one embodiment of the present disclosure. Referring to FIG. 6, the decoding method includes following steps of Step S21 and Step S22.

In Step S21, when the demodulated data in a buffer space is enough to form a second predetermined number of CB data, reading the demodulated data to form the second predetermined number of CB data in the buffer space respectively.

In Step S22, decoding the second predetermined number of CB data respectively.

A detailed process of the decoding method shown in FIG. 6 is described in the following part in conjunction with FIG. 4, which illustrates a schematic diagram of processing a PDSCH in a communication system in the present disclosure.

Different from the conventional technology, in some embodiments, as described in Step S21, when demodulated data in the buffer space 27 is enough to form a second predetermined number of CB data, the demodulated data to form the second predetermined number of CB data in the buffer space is read respectively.

Specifically, same as the demodulation method described above, the buffer space 27 may include a plurality of buffer regions, such as CW buffer region 1, CW buffer region 2, . . . , and CW buffer region n. Each CW buffer region stores the demodulated data belonging to the CW buffer region respectively, wherein the demodulated data is soft-bit data. Furthermore, the buffer regions may be FIFO buffers and the amount of the buffer regions may be 2 or 4 according to the MIMO channel information.

In practice, the FEC decoder 28 determines whether the demodulated data in each of the buffer regions is enough to form the second predetermined number of CB data or not one by one. If the demodulated data in one of the buffer regions corresponding to a CW is enough to form the second predetermined number of CB data, the demodulated data enough to form the second predetermined number of CB data and belonging to the CW is read from the buffer region. The second predetermined number is 1 to 3. In the following example, the second predetermined number is 1. Namely, when the demodulated data in the buffer space is enough to form one CB data, the demodulated data enough to form the second predetermined number of CB data is read respectively from the buffer regions.

It is known to those skilled in the art that, in the TD-LTE system, all the demodulated data belonging to a CB data is stored in a buffer region corresponding to a CW. The number of the demodulated data in a CB data is set according to relative communication protocols and modulation parameters of different UE in advance. According to the advance setting, when the demodulated data in at least one buffer region (for example, CW buffer region 1) in the buffer space is enough to form a CB data, the FEC decoder 28 reads the demodulated data which forms the CB data.

Then, whether the demodulated data in the next buffer region corresponding to next CW (for example, CW buffer region 2) is enough to form one CB data or not is determined, and so on, till a last buffer region (for example, CW buffer region n) in the buffer space is determined, and then proceed to a first buffer region (for example, CW buffer region 1) to determine, and so on, till all the buffer regions (namely, CW buffer region 1 to CW buffer region n) in the buffer space are determined. In the decoding method in the present disclosure, the demodulated data in a plurality of buffer regions is read evenly without a situation that the demodulated data in one of the plurality of buffer regions is read continuously to be decoded, while demodulated data in other buffer regions is kept waiting to be read. Therefore, the present disclosure ensures that the demodulated data is input into each of the plurality of buffer regions continuously.

According to the mentioned embodiment where the second predetermined number is 1, the embodiment where the second predetermined number is 2 or 3 may be performed by those who skilled in this art, which is not described in detail therein.

Furthermore, in some embodiments, the FEC decoder 28 suspends decoding when the demodulated data in the buffer space is not enough to form the second predetermined number of CB data, and waits the MIMO demodulator 26 to demodulate the RE data and stores the demodulated RE data in the buffer space 27. When the demodulated data in the buffer space 27 is enough to form the second predetermined number of CB data, the FEC decoder 28 reads all the demodulated data to form each of the second predetermined number of CB data in the buffer space respectively.

As described in Step S22, the second predetermined number of CB data is decoded respectively.

Specifically, referring to FIG. 4, according to the second predetermined number of CB data read in Step S21, the FEC decoder 28 decodes the second predetermined number of CB data respectively. The detailed decoding process may refer to the prior art, including processes performed by a de-scramble unit, a de-rate matching unit 282, a HARQ unit 283, a channel decoding unit 284 and a CRC (Cyclic Redundancy Check) check unit 285 and so on. The mentioned processes are known to those skilled in this art, which are not described in detail.

In practice, after decoding the demodulated data in CB data, a check needs to be performed on the decoded data, such as a CRC check. If the check is successful, information codes in the CB data need to be concentrated to form TB data. It is known to those skilled in this art that each of the CB information codes in one TB data is cached in a same CW buffer region. Therefore, when the CB data extracted from a CW buffer region (after the check, only the information codes in the CB data need to be extracted) is enough to form one TB data, the CB information codes in the CB data are concentrated in certain order to form one TB data, where the number of the CB information codes in each TB data and the certain order is determined according to corresponding communication protocols, which is not described in detail.

Figure 9:
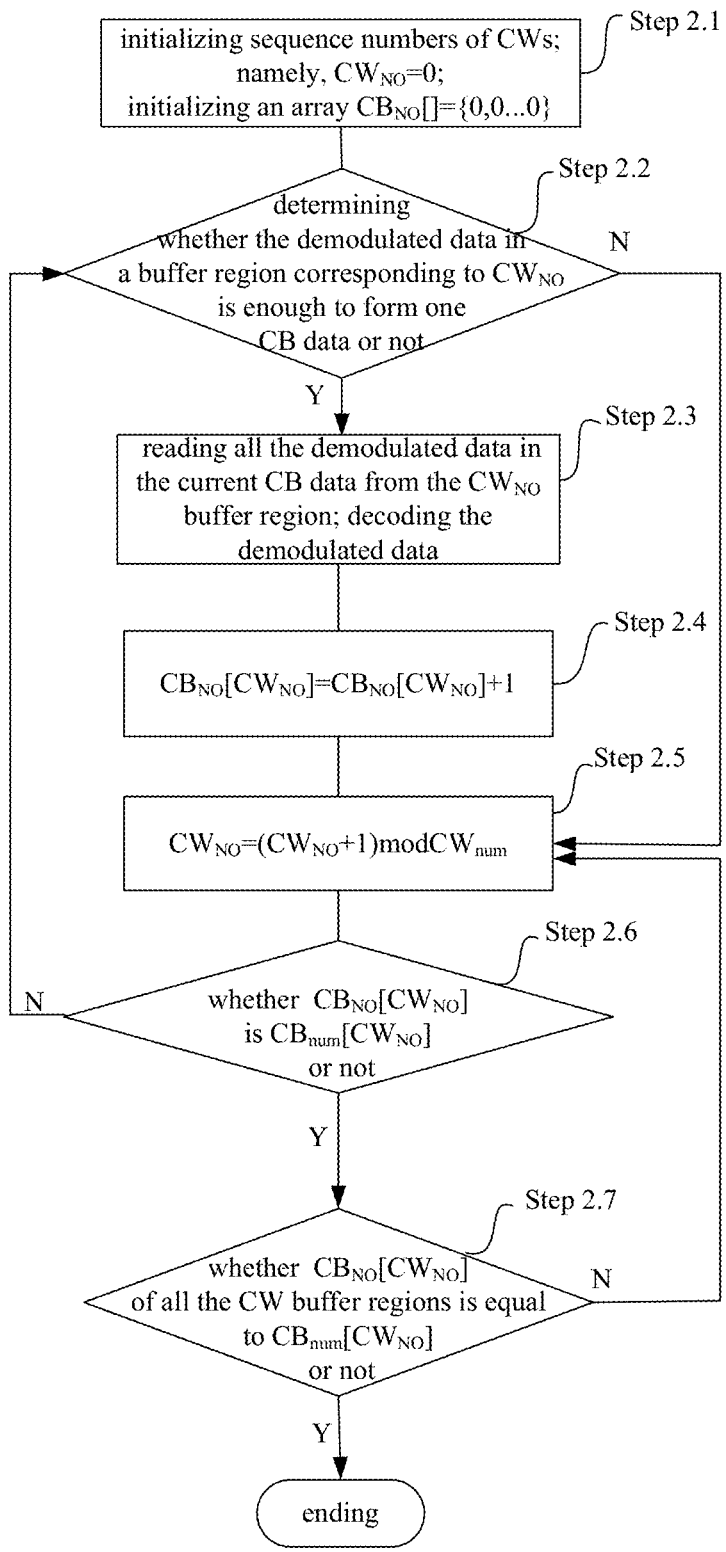
FIG. 9 illustrates a schematic flow chart of a decoding method of one subframe in a communication system according to one embodiment of the present disclosure.

Further to above modulation embodiment, a decoding method is described hereunder. Similarly, in some embodiments, the number of the OFDM symbols which carried by the PDSCH is 13, the number of the CW buffer regions in the buffer space is 2, the first predetermined number is X (X>=1) and the second predetermined number is 1. FIG. 9 illustrates a schematic flow chart of the decoding method according to some embodiments of the present disclosure.

Step 2.1 sequence numbers of CWs from the first CW buffer region in the buffer space is initialized, namely, $CW_{NO}=0$, wherein $CW_{NO}$ represents the sequence number of a CW; and an array $CB_{NO}[\ ]=\{0, 0, \ldots 0\}$ is initialized, wherein $CB_{NO}[\ ]$ represents the sequence number of the current CB data in each CW, the size of $CB_{NO}[\ ]$ is $CW_{num}$, being the number of the CWs. In the embodiment, $CW_{num}$ is 2, thus the array is initialized as $CB_{NO}[\ ]=\{0, 0\}$, wherein $CB_{NO}[CW_{NO}]=0$, namely, $CB_{NO}[0]=0$ and $CB_{NO}[1]=0$.

Step 2.2, whether the demodulated data in a buffer region corresponding to the $CW_{NO}$ is enough to form one CB data or not is determined; if so, proceeding to Step 2.3; otherwise, proceeding to Step 2.5.

Step 2.3, all the demodulated data (soft-bit data) in the current CB data is read from the $CW_{NO}$ buffer region according to the current $CB_{NO}[CW_{NO}]$ and the data (FEC decoding) is decoded.

Step 2.4, $CW_{NO}[CW_{NO}]=CW_{NO}[CW_{NO}]+1$, namely, the sequence number of the current CB data in the $CW_{NO}$ buffer region is increased by 1.

Step 2.5, $CW_{NO}=(CW_{NO}+1)\bmod CW_{num}$, namely, the sequence number of the CW buffer region is increased by 1.

Step 2.6, whether all the CB data in the $CW_{NO}$ buffer region is decoded or not is determined, namely, whether $CB_{NO}[CW_{NO}]$ is $CB_{num}[CW_{NO}]$ or not, wherein $CB_{num}[\ ]$ is an array representing the number of CB data in each CW buffer region and the length of $CB_{num}[\ ]$ is $CW_{num}$; in the embodiment, $CB_{num}[\ ]=\{9, 9\}$, namely, $CB_{num}[0]=9$ and $CB_{num}[1]=9$; if $CW_{NO}[CW_{NO}]$ is $CB_{num}[CW_{NO}]$, proceeding to Step 2.7; otherwise, proceeding to Step 2.2.

Step 2.7, whether all the CB data in all the CW buffer region is read or not is determined, namely, whether $CW_{NO}[CW_{NO}]$ of all the CW buffer regions are equal to $CB_{num}[CW_{NO}]$ or not; if so, the decoding in the subframe is finished; otherwise, proceeding to Step 2.5.

Figure 7:
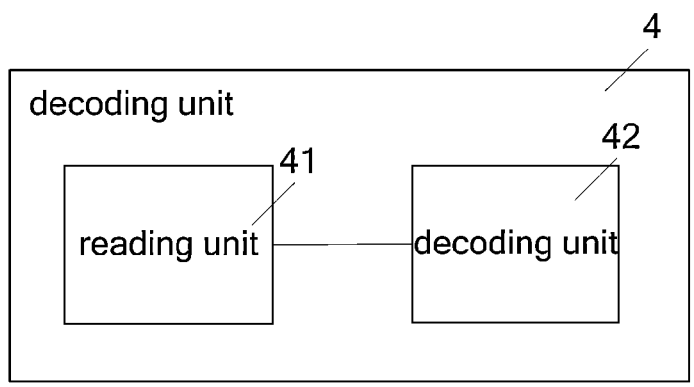
FIG. 7 illustrates a schematic structure diagram of a decoding apparatus in a communication system according to one embodiment of the present disclosure.

Embodiments of the present disclosure further provide a decoding apparatus in a communication system, configured to decode the demodulated data in the downlink channel. FIG. 7 illustrates a schematic structure diagram of the decoding apparatus in a communication system according to one embodiment of the present disclosure.

Referring to FIG. 7, the decoding apparatus includes a reading unit 41 and a decoding unit 42. The reading unit 41 is configured to read all the demodulated data which forms each of the second predetermined number of CB data in the buffer space respectively, when the demodulated data in the buffer space is enough to form a second predetermined number of CB data; the decoding unit 42 is configured to decode the second predetermined number of CB data read by the reading unit 21 respectively. The second predetermined number is 1 to 3.

In some embodiments, the buffer space includes a plurality of buffer regions corresponding to CWs. Each of the plurality of buffer regions stores the demodulated data belonging to a corresponding CW respectively. The reading unit 41 is configured to read all the demodulated data which forms each of the second predetermined number of CB data in the CW buffer regions respectively. The CW buffer regions are FIFO buffers. The amount of the buffer regions may be 2 or 4 according to the MEMO channel information. In some embodiments, the demodulated data is soft-bit data.

The detailed process of the decoding apparatus 4 may refer to the detailed process of the decoding method in a communication system, which is not described in detail.

Embodiments of the present disclosure further provide a baseband chip in a UE. The baseband chip includes the demodulation apparatus 3 shown in FIG. 5 and the decoding apparatus 4 shown in FIG. 7. In practice, there is a buffer space between the demodulation apparatus 3 and the decoding apparatus 4. The buffer space is configured to store the RE data demodulated data demodulated by the demodulation apparatus 3 and provide all the demodulated data which is enough to form the second predetermined number of CB data for the decoding apparatus 4. Therefore, the demodulation apparatus 3 and the decoding apparatus 4 may perform in parallel.

Furthermore, according to the demodulation method and the decoding method in the present disclosure, the demodulation apparatus 3 demodulates the RE data in a subframe to obtain demodulated data and store the demodulated data in the CW buffer regions in the buffer space. However, the decoding apparatus 4 read all the demodulated data which forms each of the second predetermined number of CB data in the buffer space respectively, once the demodulated data in the buffer space surely forms the second predetermined number of CB data, and decodes the CB data respectively. Therefore, the demodulated data in the buffer space is reduced and the buffer space in the baseband chip is saved.

In the following example, the largest CASE required by a Category 3 cell phone in a TD-LTE system is taken for example. Bandwidth (BW) is 20 MHZ, Resource Block Number (RB Number) is 100, Modulation and Coding Scheme Index (MCS Index) is 23 and 2×2 MIMO, CW is 2 (QAM64 modulation, each CW carrying 9 CB data) and one demodulated data occupies one Byte (totally 8 bit).

According to the conventional technology, buffer space of a decoding method in subframe is: 100×(3×10+10×12)×6×

2×2=360 kByte (the greatest number of OFDM symbols including data in PDSCH being 13, where 3 OFDM symbols carry Reference signal (RS)), QAM64 modulation, 2*2 MIMO, and buffer space being ping-pong buffer.

According to the decoding method in the present disclosure, size of a buffer space may vary according to different demodulation methods and decoding methods. But at least one maximum soft-bit data for decoding one CB data needs to be cached (the maximum is 3×6176). In a practical system in the Category 3 cell phone, to make a MIMO demodulator and a FEC decoder perform in parallel and achieve the requirement of decoding sequence, only the maximum soft-bit data for decoding 2.5 CB data needs to be cached in the buffer space. Thus, size of the required buffer space is: 2×3×6176×2.5=92.64 kByte (2 CW buffer regions, number of the maximum soft-bit data for decoding 2.5 CB data).

Compared with the prior art, the demodulated data in the buffer space is reduced by 267.36 kByte according to the above embodiment in the present disclosure. Besides, it is not necessary to start decoding only when there is a subframe demodulated data in the buffer space. Therefore, decoding delay may decrease and the real-time performance of a communication system may be improved.

In conclusion, the present disclosure provides a demodulation method in a communication system. The demodulation method is configured to demodulate service data in a downlink channel, including: demodulating RE data belonging to the downlink channel in OFDM symbols one by one to obtain demodulated data; storing the demodulated data in a buffer space; suspending demodulating the RE data when the buffer space is not big enough to store a first predetermined number of demodulated data; continuing demodulating RE data when the buffer space is big enough to store the first predetermined number of demodulated data and storing the demodulated data of RE data in the buffer space. Since the RE data belongs to a plurality of CWs, accordingly, the buffer space includes a plurality of buffer regions corresponding to the CWs. The demodulated data is stored in corresponding buffer regions according to the CW the demodulated data belongs to.

The present disclosure further provides a decoding method in a communication system based on the demodulation method. The decoding method is configured to: when the demodulated data in a buffer space is enough to form a second predetermined number of CB data, reading all the demodulated data in the buffer space respectively, which forms each of the second predetermined number of CB data; decoding the second predetermined number of CB data. The buffer space includes a plurality of buffer regions and each of the plurality of buffer regions stores the demodulated data belonging to a corresponding CW. Accordingly, the demodulated data enough to form each of the second predetermined number of CB data and belonging to each CW is read respectively from the CW buffer regions. In some embodiments, the buffer regions may be FIFO buffers. When the demodulated data in the buffer regions is enough to form the second predetermined number of CB data, all the decoded data in the CB data is read one by one in the order of FIFO and the CB data is decoded then.

In the present disclosure, in a baseband chip in a UE, the demodulation process stores the demodulated RE data in a buffer space constantly while the decoding process starts decoding as long as there one CB data is cached in the buffer space; the demodulation process suspends and waits the decoding process to read the demodulated data when the buffer space is full of the demodulated data, the decoding process is suspends to decode, in order to wait the demodulation process to store the demodulated data in the buffer space when there is less than one CB data in the buffer space.

It's not necessary to start decoding until there are a subframe demodulated data in the buffer space. The decoding process starts when at least one CB data is cached in the buffer space. As a result, demodulation and decoding of one subframe may be performed in parallel, thereby saving the memory space in the baseband chip. Furthermore, since decoding process starts decoding when only one CB data is cached in the buffer space, decoding delay may be decreased and the real-time performance of a communication system may be improved.

Although the present disclosure has been disclosed as above with reference to preferred embodiments thereof but will not be limited thereto. Those skilled in the art can modify and vary the embodiments without departing from the spirit and scope of the present disclosure. Accordingly, without departing from the scope of the present invented technology scheme, whatever simple modification and equivalent variation belong to the protection range of the present invented technology scheme.

What is claimed is:

1. A demodulation method in a communication system configured to demodulate service data in a downlink channel, comprising:

demodulating Resource Element (RE) data belonging to the downlink channel in Orthogonal Frequency Division Multiplexing (OFDM) symbols one by one to obtain demodulated data and storing the demodulated data in a buffer space;

suspending demodulating RE data when the buffer space does not have enough space to store a first predetermined number of demodulated data; and continuing demodulating RE data when the buffer space has enough space to store the first predetermined number of demodulated data and storing the demodulated RE data in the buffer space;

where RE data comprises information modulated in a plurality of Code Words (CWs), the buffer space comprises a plurality of buffer regions corresponding to CWs respectively, the demodulated data comprises a plurality of demodulated data belonging to different CWs and storing the demodulated data in the buffer space comprises storing the demodulated data belonging to different CWs in corresponding buffer regions corresponding to CWs respectively.

2. The demodulation method according to claim 1, where suspending demodulating RE data when the buffer space does not have enough space to store the first predetermined number of demodulated data comprises suspending demodulating RE data as long as there is one buffer region corresponding to a CW in the buffer space not having enough space to store the first predetermined number of demodulated data belonging to the CW.

3. The demodulation method according to claim 1, where continuing demodulating RE data when the buffer space has enough space to store the first predetermined number of demodulated data comprises: continuing demodulating RE data when each of the plurality of buffer regions corresponding to different CWs in the buffer space has enough space to store the first predetermined number of demodulated data belonging to the CWs.

4. The demodulation method according to claim 1, where the buffer regions are First Input First Output (FIFO) buffers.

5. The demodulation method according to claim 1, where the amount of the buffer regions is 2 or 4.

6. The demodulation method according to claim 1, wherein the first predetermined number is equal to or greater than 1.

7. The demodulation method according to claim 1, where the demodulated data is soft-bit data.

8. The demodulation method according to claim 1, wherein before demodulating RE data in OFDM symbols one by one, the method further comprises: obtaining RE data corresponding to the downlink channel in the OFDM symbols and channel estimation data corresponding to the OFDM symbols.

9. The demodulation method according to claim 1, where the communication system is a Time Division-Long Term Evolution (TD-LTE) system and the downlink channel is a Physical Downlink Shared Channel (PDSCH).

10. A demodulation apparatus in a communication system configured to demodulate service data in a downlink channel, comprising:
a demodulation unit configured to demodulate Resource Element (RE) data belonging to the downlink channel in Orthogonal Frequency Division Multiplexing (OFDM) symbols one by one to obtain demodulated data;
a storing unit configured to store the demodulated data from the demodulation unit in a buffer space; and
a control unit configured to control the demodulation unit to suspend demodulating RE data when the buffer space does not have enough space to store the first predetermined number of demodulated data, and control the the demodulation unit to continue demodulating the RE data when the buffer space has enough space to store the first predetermined number of demodulated data and control the storing unit to store the demodulated RE data in the buffer space;
where the RE data comprises information modulated in a plurality of Code Words (CWs), the buffer space comprises a plurality of buffer regions corresponding to CWs respectively, the demodulated data comprises a plurality of demodulated RE data belonging to different CWs and the storing unit is configured to store the demodulated data belonging to different CWs into corresponding buffer regions corresponding to CWs respectively.

11. The demodulation apparatus according to claim 10, where suspending demodulating RE data when the buffer space does not have enough space to store the first predetermined number of demodulated data comprises: suspending demodulating RE data as long as there is one buffer region corresponding to a CW in the buffer space not having enough space to store the first predetermined number of demodulated data belonging to the CW.

12. The demodulation apparatus according to claim 10, where continuing demodulating RE data when the buffer space has enough space to store the first predetermined number of demodulated data comprises: continuing demodulating RE data when each of the plurality of buffer regions corresponding to CWs respectively in the buffer space has enough space to store the first predetermined number of demodulated data belonging to the CWs.

13. The demodulation apparatus according to claim 10, where the buffer regions are First Input First Output (FIFO) buffers.

14. The demodulation apparatus according to claim 10, where the amount of the buffer regions is 2 or 4.

15. The demodulation apparatus according to claim 10, where the first predetermined number is equal to or greater than 1.

16. The demodulation apparatus according to claim 10, where the demodulated data is soft-bit data.

17. The demodulation apparatus according to claim 10, further comprising: a reading unit configured to read RE data in the OFDM symbols and the channel estimation data corresponding to the OFDM symbols according to the mapping relation of RE data in the downlink channel, before the demodulation unit demodulates RE data.

18. The demodulation apparatus according to claim 10, where the communication system is a Time Division-Long Term Evolution (TD-LTE) system and the downlink channel is a Physical Downlink Shared Channel (PDSCH).

19. In a communication system configured to decode demodulated data in a downlink channel, where different parts of the demodulated data are transmitted to a buffer space one by one and stored into different buffer regions of the buffer space according to Code Words (CWs), respectively, a decoding method comprising:
before all the demodulated data are received by the buffer space, once a first part of the demodulated data stored in one of the buffer regions reaches an amount enough to form a second predetermined number of Code Block (CB) data, reading the second predetermined number of CB data, respectively; and
decoding the second predetermined number of CB data respectively.

20. The decoding method according to claim 19, where the buffer regions are First Input First Output (FIFO) buffers.

21. The decoding method according to claim 19, where the amount of the buffer regions is 2 or 4.

22. The decoding method according to claim 19, where the second predetermined number is 1 to 3.

23. The decoding method according to claim 19, where the demodulated data is soft-bit data.

24. A decoding apparatus in a communication system configured to decode demodulated data in a downlink channel, where a buffer space receives different parts of the demodulated data one by one and different buffer regions of the buffer space stores the different parts of the demodulated data according to Code Words (CWs), respectively, the decoding apparatus comprising:
a reading unit configured to: before all the demodulated data are received by the buffer space, once a first part of the demodulated data stored in one of the buffer regions reaches an amount enough to form a second predetermined number of Code Block (CB) data, read the second predetermined number of CB data, respectively; and
a decoding unit configured to decode the second predetermined number of CB data, respectively.

25. The decoding apparatus according to claim 24, where the buffer regions are First Input First Output (FIFO) buffers.

26. The decoding apparatus according to claim 24, where the amount of the buffer regions is 2 or 4.

27. The decoding apparatus according to claim 24, where the second predetermined number is 1 to 3.

28. The decoding apparatus according to claim 24, where the demodulated data is soft-bit data.

* * * * *